US008561735B2

(12) United States Patent
Morrow et al.

(10) Patent No.: US 8,561,735 B2
(45) Date of Patent: Oct. 22, 2013

(54) SELF-CONTAINED AXLE MODULE

(75) Inventors: Jon J. Morrow, Neenah, WI (US); Eric Braun, Oshkosh, WI (US); Nader Nasr, Neenah, WI (US); Gary Schmiedel, Oshkosh, WI (US); Martin Schimke, Redgranite, WI (US); Donald H. Verhoff, Oshkosh, WI (US); Christopher K. Yakes, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 419 days.

(21) Appl. No.: 12/576,166

(22) Filed: Oct. 8, 2009

(65) Prior Publication Data

US 2010/0116569 A1 May 13, 2010

Related U.S. Application Data

(63) Continuation-in-part of application No. 12/045,571, filed on Mar. 10, 2008, now abandoned, which is a continuation of application No. 10/952,540, filed on Sep. 28, 2004, now Pat. No. 7,357,203.

(51) Int. Cl.
*B60K 1/00* (2006.01)
(52) U.S. Cl.
USPC ........................................ 180/65.1; 180/65.6
(58) Field of Classification Search
USPC ................ 180/252, 253, 254, 256, 257, 65.1, 180/65.5, 65.6
See application file for complete search history.

(56) References Cited

U.S. PATENT DOCUMENTS

| 644,225 | A | * | 2/1900 | Elsner | 180/253 |
|---|---|---|---|---|---|
| 896,208 | A | | 8/1908 | Hoffmann | |
| 1,223,495 | A | | 4/1917 | Kelley | |
| 1,233,846 | A | * | 7/1917 | Cochran | 475/229 |
| 1,251,749 | A | * | 1/1918 | Cilley | 180/65.6 |
| 1,735,404 | A | * | 11/1929 | Masury | 180/65.6 |
| 1,780,370 | A | | 11/1930 | Tenney | |

(Continued)

FOREIGN PATENT DOCUMENTS

| EP | 1 229 636 A2 | 8/2002 |
|---|---|---|
| EP | 1 340 643 A2 | 9/2003 |

(Continued)

OTHER PUBLICATIONS

Jenkins et al., "Characteristics of SOI FET's Under Pulsed Conditions", *IEEE Transactions on Electron Devices*, vol. 44, No. 11, Nov. 1997, (pp. 1923-1930).

(Continued)

*Primary Examiner* — Frank Vanaman
(74) *Attorney, Agent, or Firm* — Foley & Lardner LLP

(57) ABSTRACT

A self-contained axle module for a vehicle having a support structure is provided. The self-contained axle includes a housing removably coupled to the support structure and an output shaft extending from the housing. An electric motor is coupled to the housing and drives the output shaft. Two wheel end assemblies are coupled to the output shaft, and an independent suspension assembly is coupled between each wheel end assembly and the housing, so that the independent suspension assemblies and the wheel end assemblies and the electric motor and the housing are removable from the vehicle as a unit by detaching the housing from the support structure.

19 Claims, 4 Drawing Sheets

(56) References Cited

U.S. PATENT DOCUMENTS

| | | | |
|---|---|---|---|
| 2,731,099 A | | 1/1956 | Schroeder |
| 3,477,536 A | | 11/1969 | Carini |
| 3,566,165 A | * | 2/1971 | Lohr ............................ 310/67 R |
| 3,826,327 A | | 7/1974 | Stover |
| 4,270,622 A | * | 6/1981 | Travis ........................ 180/65.31 |
| 4,335,429 A | | 6/1982 | Kawakatsu |
| 5,163,528 A | * | 11/1992 | Kawamoto et al. ........ 180/65.51 |
| 5,224,563 A | | 7/1993 | Iizuka et al. |
| 5,322,141 A | | 6/1994 | Brunner et al. |
| 5,378,010 A | | 1/1995 | Marino et al. |
| 5,538,274 A | | 7/1996 | Schmitz et al. |
| 5,558,588 A | | 9/1996 | Schmidt |
| 5,562,178 A | | 10/1996 | Worden et al. |
| 5,669,842 A | | 9/1997 | Schmidt |
| 5,685,798 A | | 11/1997 | Lutz et al. |
| 5,755,456 A | | 5/1998 | Blažek et al. |
| 5,808,427 A | | 9/1998 | Worden et al. |
| 5,820,150 A | | 10/1998 | Archer et al. |
| 5,829,542 A | * | 11/1998 | Lutz ............................ 180/65.6 |
| 5,925,993 A | | 7/1999 | Lansberry |
| 6,062,579 A | | 5/2000 | Fortier |
| 6,105,984 A | | 8/2000 | Schmitz et al. |
| 6,148,940 A | | 11/2000 | Hokanson et al. |
| 6,398,685 B1 | | 6/2002 | Wachauer et al. |
| 6,431,298 B1 | | 8/2002 | Ruppert, Jr. et al. |
| 6,491,123 B1 | | 12/2002 | Pasquini et al. |
| 6,516,907 B2 | | 2/2003 | Robinson |
| 6,516,914 B1 | | 2/2003 | Andersen et al. |
| 6,520,494 B1 | | 2/2003 | Andersen et al. |
| 6,533,696 B1 | | 3/2003 | Takenaka et al. |
| 6,561,718 B1 | | 5/2003 | Archer et al. |
| 6,651,762 B1 | | 11/2003 | Hokanson et al. |
| 6,692,395 B2 | | 2/2004 | Rodeghiero et al. |
| 6,708,788 B2 | | 3/2004 | Kuwayama |
| 6,757,597 B2 | | 6/2004 | Yakes et al. |
| 6,764,085 B1 | | 7/2004 | Anderson |
| 6,843,750 B1 | | 1/2005 | Bennett |
| 6,899,190 B2 | | 5/2005 | Bordini |
| 6,904,987 B2 | | 6/2005 | Haas et al. |
| 6,935,451 B2 | | 8/2005 | Bell et al. |
| 6,935,990 B2 | | 8/2005 | Kim |
| 6,976,688 B2 | | 12/2005 | Archer et al. |
| 6,978,853 B2 | | 12/2005 | Bennett |
| 7,028,583 B2 | | 4/2006 | Bennett |
| 7,104,920 B2 | | 9/2006 | Beaty et al. |
| 7,115,057 B2 | | 10/2006 | House |
| 7,134,517 B1 | | 11/2006 | Kaiser et al. |
| 7,357,203 B2 | | 4/2008 | Morrow et al. |
| 7,448,460 B2 | | 11/2008 | Morrow et al. |
| 2002/0092687 A1 | | 7/2002 | Forster |
| 2002/0103580 A1 | | 8/2002 | Yakes et al. |
| 2003/0159865 A1 | | 8/2003 | Schmidt |
| 2003/0205422 A1 | | 11/2003 | Morrow et al. |
| 2004/0163893 A1 | | 8/2004 | Langen |
| 2006/0070776 A1 | | 4/2006 | Morrow et al. |
| 2006/0192361 A1 | | 8/2006 | Anderson et al. |
| 2009/0127010 A1 | | 5/2009 | Morrow et al. |

FOREIGN PATENT DOCUMENTS

| | | |
|---|---|---|
| FR | 2 851 621 A1 | 8/2004 |
| WO | WO 2006/037098 A2 | 4/2006 |
| WO | WO 2006/037099 A1 | 4/2006 |

OTHER PUBLICATIONS

PCT International Search Report, relating to International Application No. PCT/US2005/035007, date of mailing of the International Search Report Mar. 22, 2006 (2 pgs.).

PCT International Search Report, relating to International Application No. PCT/US2005/035008, date of mailing of the International Search Report Feb. 1, 2006 (2 pgs.).

\* cited by examiner

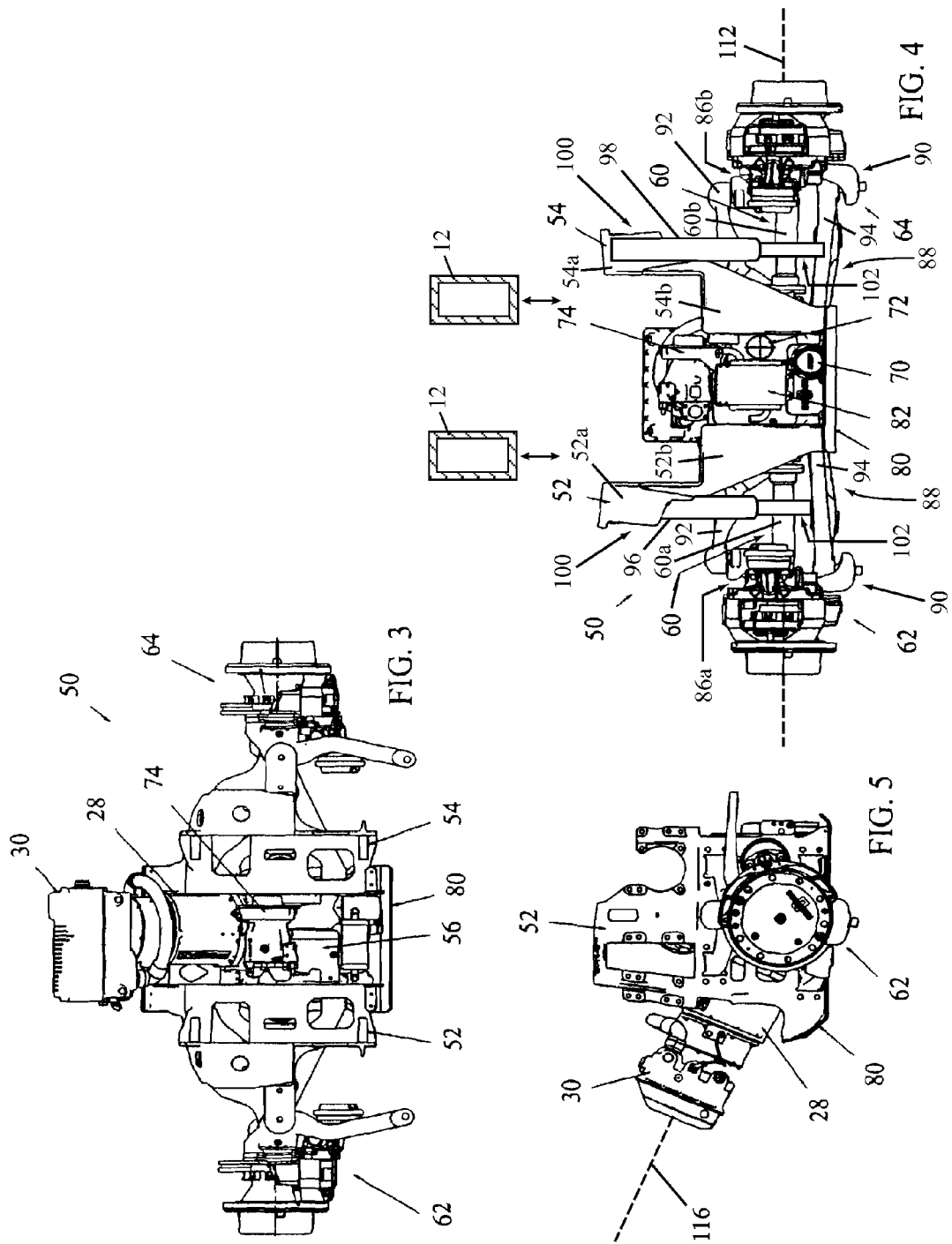

SELF-CONTAINED AXLE MODULE

CROSS-REFERENCE TO RELATED PATENT APPLICATIONS

This application is a Continuation-in-Part of U.S. patent application Ser. No. 12/045,571, "Self-Contained Axle Module," filed Mar. 10, 2008, incorporated herein by reference in its entirety, which is a Continuation of U.S. Pat. No. 7,357,203, "Self-Contained Axle Module," filed Sep. 28, 2004, incorporated herein by reference in its entirety.

FIELD

The present invention relates generally to hybrid electric vehicles, and more particularly to a self-contained axle module for an electric vehicle.

BACKGROUND

In a conventional electric vehicle, a prime mover such as a diesel engine, is used to drive an electric generator or alternator which supplies electric current to a plurality of electric motors. The electric motors typically are coupled to wheel sets, in line, on the vehicle. The vehicles that utilize this type of hybrid electric motor are typically railroad locomotives.

The prime mover drives the generator/alternator that typically produces an AC current that is then fully rectified with resulting DC current and voltage being distributed to current converters coupled to the electric motors. Such systems are highly integrated with each of the components typically designed and manufactured to operate with the other components in the overall system. In other words, "off the shelf" components are not readily adaptable for use in the initial design or ongoing maintenance of such vehicles. Further, such vehicles have multiple components associated with the change of AC to DC to AC power. Maintenance of such systems is expensive since specific components must be used.

In the use of hybrid drives for such electric vehicles, it is often necessary to add support systems such as pressurized lubrication and supplemental cooling for the motors and other components. Typically, these systems are centrally mounted on the vehicle and require the routing of specialized, pressurized, conduits to move the oil and coolant medium to specific points around the vehicle. Such additional equipment in conduit routings typically take up space that could be utilized for other purposes, such as cargo space. Such arrangements also are not cost effective since additional materials, e.g., conduits, pumps, filters, are required.

Thus there is a need for a self contained axle module for an electric vehicle that includes lubrication pump, filter, and heat exchanger integrated into a single module. There is a further need for a self-contained axle module for a hybrid electric vehicle that is easy to replace and repair, particularly in the field. There is also a need for an electric vehicle that includes a self-contained axle module.

SUMMARY

There is provided a self-contained axle module for a vehicle. The vehicle includes a support structure, a source for electric power, a source of cooling medium, and a vehicle control device. The self-contained axle includes a first side plate removably coupled to the support structure. A second side plate removably coupled to the support structure. A housing coupled to the first and second side plate. An electric motor coupled to the housing and the source for electric power. A motor drive controller unit coupled to the electric motor and to the vehicle control device to communicate signals to the vehicle control device such that one of the speed and torque of the electric motor is controlled based upon the signals. A gear train is mounted in the housing and coupled to the electric motor and an output shaft, wherein, the self-contained axle module can be selectively coupled and decoupled from the support structure. The self-contained axle module can include a first wheel end assembly coupled to the housing in the output shaft and a second wheel end assembly coupled to the housing and the output shaft. Another embodiment of the self-contained axle module includes an oil pump mounted inside the housing and immersed in oil. A further embodiment of a self-contained axle module includes a power take off apparatus mounted on the housing and coupled to the gear train and a tool.

There is also provided a vehicle comprising a vehicle support structure with a principle power unit supported by the structure. The principle power unit is not a battery. An electric AC power bus including at least two phase conductors is coupled to the principle power unit. A power storage unit is coupled to the AC power bus. A pair of self-contained axle modules are coupled to the vehicle support structure. A vehicle controller is coupled to each self-contained axle module and the AC power bus. A data bus is coupled to each self-contained axle module and vehicle controller. Each self-contained axle module includes a first side plate removably coupled to the support structure. A second side plate removably coupled to the support structure. The housing coupled to the first and second side plates. An electric motor coupled to the housing and the principle power unit. A motor drive controller unit coupled to the electric motor and to the vehicle controller to communicate signals to the vehicle controller such that one of the speed and torque of the electric motor is controlled based upon the signals. A gear train is mounted in the housing and coupled to the electric motor and an output shaft. The first wheel end assembly is coupled to the housing in the output shaft and a second wheel end assembly is coupled to the housing and output shaft. Each self-contained axle module can be selectively coupled and decoupled from the support structure. Another embodiment of the vehicle includes a plurality of suspension assemblies wherein each suspension assembly independently suspends one of the wheel end assemblies relative to the vehicle support structure.

According to another embodiment, a self-contained axle module with independent suspension for a vehicle comprises a housing configured to be coupled to a support structure of the vehicle; an electric motor coupled to a gear train coupled to the housing; a first wheel end assembly coupled to the gear train; a second wheel end assembly coupled to the gear train; a first independent suspension assembly having a first end coupled to the housing and a second end coupled to the first wheel end assembly; a first spring having a first end coupled to the housing and a second end coupled to the first independent suspension assembly; a second independent suspension assembly having a first end coupled to the housing and a second end coupled to the second wheel end assembly; and a second spring having a first end coupled to the housing and a second end coupled to the second independent suspension assembly. The independent suspension assemblies and the wheel end assemblies and the housing and the electric motor and the gear train and the springs are configured to be removable from the support structure as a unit by removing the housing from the support structure.

According to another embodiment, a self-contained axle module system for a vehicle comprises a first self-contained axle module and a second self-contained axle module configured to be coupled to a support structure of the vehicle at any one of a plurality of positions relative to the other. Each self-contained axle module comprises a housing; an electric motor supported by the housing and rotatably coupled to a gear train; a first wheel end assembly coupled to the gear train; a second wheel end assembly coupled to the gear train; a first independent suspension assembly having a first end coupled to the housing and a second end coupled to the first wheel end assembly; a first spring having a first end coupled to the housing and a second end coupled to the first independent suspension assembly; a second independent suspension assembly having a first end coupled to the housing and a second end coupled to the second wheel end assembly; and a second spring having a first end coupled to the housing and a second end coupled to the second independent suspension assembly. The independent suspension assemblies and the wheel end assemblies and the housing and the electric motor and the gear train and the springs are configured to be removable from the support structure as a unit by removing the housing from the support structure.

According to another embodiment, a self-contained axle module with independent suspension for a vehicle comprises a housing configured to be coupled to a support structure of the vehicle; an output shaft projecting externally from the housing; an electric motor coupled to the housing and operable to rotate the output shaft; a first wheel end assembly coupled to the output shaft; and a first independent suspension assembly coupled to the first wheel end assembly and to the housing to permit movement of the first wheel end assembly independent of the housing. The first independent suspension assembly, the first wheel end assembly, and the housing are removable from the support structure as a unit by removing the housing from the support structure.

BRIEF DESCRIPTION OF THE DRAWINGS

FIG. 3 is a top view of an exemplary embodiment of a self-contained axle module including two wheel end assemblies and with the springs not shown for clarity.

FIG. 4 is a rear view of the self-contained axle module illustrated in FIG. 3 shown exploded from the support structure.

FIG. 5 is a side view of a portion of the self-contained axle module illustrated in FIG. 3.

DETAILED DESCRIPTION

Figure 1:
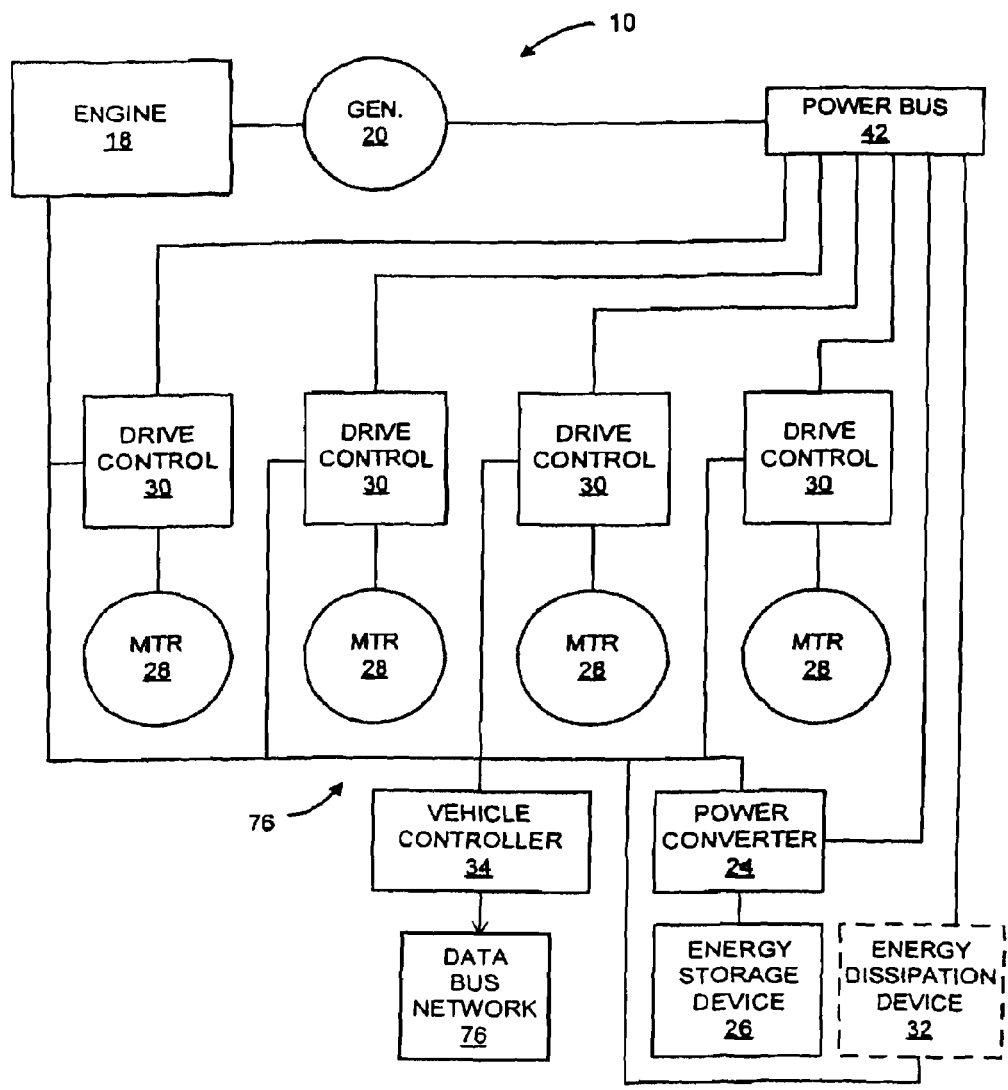
FIG. 1 is a schematic diagram of an electric vehicle according to an exemplary embodiment.

FIG. 1 is a schematic diagram of an electric vehicle 10 according to an exemplary embodiment. An electric vehicle is a vehicle that uses electricity in some form or another to provide all or part of the propulsion power of the vehicle. This electricity can come from a variety of sources, such as stored energy devices relying on chemical conversions (batteries), stored electrical charge devices (capacitors), stored energy devices relying on mechanical stored energy (e.g. flywheels, pressure accumulators), and energy conversion products. A hybrid electric vehicle is an electric vehicle that uses more than one sources of energy, such as one of the electrical energy storage devices mentioned above and another source, such as an internal combustion engine. By having more than one source of energy some optimizations in the design can allow for more efficient power production, thus one can use power from different sources to come up with a more efficient system for traction. The electric vehicle 10 can be used to implement electric vehicles in general and/or hybrid electric vehicles in particular. The electric vehicle 10 can implement a number of different vehicle types, such as a fire-fighting vehicle, military vehicle, snow blower vehicle, refuse handling vehicle, concrete mixing vehicle, etc.

In the illustrated embodiment, the electric vehicle 10 includes an engine 18, a generator 20, an electric power converter 24, an energy storage device 26, a plurality of electric motors 28, a plurality of drive controllers 30, and a vehicle controller or vehicle control device 34. Electric vehicle 10 optionally includes an energy dissipation unit or device 32. The generator 20, the drive controllers 30, and the electric power converter 24 are interconnected by a power bus 42, such as an AC or DC power bus. Electric vehicle 10 is generally configured to use a combination of the engine 18 and the generator 20 to provide braking capability and to dissipate excess electrical power generated by the electric motors 28 during regenerative braking.

The engine 18 is preferably an internal combustion engine, such as a diesel engine configured to both provide mechanical power to the generator 20 and to receive mechanical power from generator such that it may function as a mechanical engine brake or air compressor. The generator 20 is coupled to the engine 18 and may be configured to function as both a generator configured to provide AC or DC power, and as a motor configured to receive electrical power and provide mechanical power to the engine 18.

The electric power converter 24 is coupled to the energy storage device 26 and is configured to convert the electrical power generated by the generator 20, or by the electric motors 28 during regenerative braking, to the energy mode required by the energy storage device 26. For example, according to an exemplary embodiment, the electric power converter is configured to convert AC power generated by the generator 20 to DC power and transfer such converted power to the energy storage device 26. The electric power converter 24 may also convert the energy stored in the energy storage device 26 back to the energy mode of generator 20 to augment and supplement the power generated by generator 20 over the power bus 42. The energy storage device 26 may be electric capacitors, electrochemical capacitors or "ultracapacitors," storage batteries, a flywheel, or hydraulic accumulators.

The electric motors 28 are appropriately sized electric motors, which may be AC or DC electric motors. The electric motors 28 are configured to receive electrical power from the power bus 42 in order to provide a mechanical energy output to a wheel or axle (e.g., by being rotatably coupled thereto through a power transmission device such as gear box 58). The electric motors 28 are also configured to receive mechanical energy from the wheel or axle during regenerative braking in order to generate electrical power onto the power bus 42.

The drive controllers 30 are coupled to each electric motor 28 and are configured to control the operation of each electric motor 28. More specifically, the drive controllers are configured to allow the electric motors 28 to either receive electrical power from the power bus 42 in order to provide a mechanical energy output to a wheel or axle, or to receive mechanical energy from the wheel or axle during regenerative braking in order to generate electrical power onto the power bus 42.

The vehicle controller 34 is coupled to the engine 18, the generator 20, the electric power converter 24, and the drive controllers 30 via a data bus network 76. The vehicle controller 34 is generally configured to control the operation of the engine 18, the generator 20, the electric power converter 24, the energy storage device 26, the plurality of electric motors 28, and the plurality of drive controllers 30. More specifically, the vehicle controller 34 is configured to assist in controlling the distribution of electrical power on the power bus so that the flow of electrical power from generator 20 and engine 18 may be reversed to provide braking capability, and so that excess electrical power generated by the electric motors 28 during regenerative braking is routed back to the generator 20 so that it may be dissipated through engine 18.

The optional energy dissipation unit 32 is typically a resistive element through which electrical power generated by the electric motors 28 during regenerative braking is dissipated as heat if the electrical power exceeds the capacity of the energy storage device 26. Preferably, electric vehicle 10 is configured such that the excess electrical power generated by the electric motors 28 during regenerative braking is sufficiently dissipated through engine 18 and generator 20.

In conventional vehicles and particularly in vehicles having a hybrid electric drive, it is often necessary to add support systems such as pressurized lubrication and supplemental cooling systems. Such systems typically are centrally mounted on the vehicle and require the routing of pressurized oil lines throughout the vehicle. The elimination or limiting of the number of such specialized conduit lines being routed through the vehicle, results in additional space for other components and truck parts. A self-contained axle module 50 for the vehicle 10, which includes and integrates various components (e.g., a lubrication pump shown as oil pump 70, the oil filter 72, and heat exchanger 82 at the axle), minimizes the conduit routings mentioned above.

A self-contained axle module 50 can be mounted or coupled to the vehicle 10 support structure 12 at any convenient position determined by the manufacturer or user of the vehicle 10. Also, because of the modular configuration, a self-contained axle module 50 can be easily removed and replaced for maintenance or repairs. The self-contained axle module 50 is coupled to a source for electrical power such as the principal power unit 18 and generator 20 and the electric AC power bus 42. It should be understood that other sources of power, as described above, can be coupled to the self-contained axle module 50 to provide the necessary electrical power to operate the electric motor 28, as described below. In addition to coupling a source for electric power to the self-contained axle module 50, a control signal, through a data bus network 76, provides the necessary control and feedback signals for operation of the axle. It is also contemplated that supplemental cooling may be required because of the environment or operating conditions of the self-contained axle module 50 and therefore supplemental cooling source can also be coupled to the axle.

The self-contained axle module 50 includes a first side plate 52 removably coupled to the support structure 12 of the vehicle 10 and a second side plate 54 removably coupled to the support structure 12 of the vehicle 10. A housing 56 is shown coupled to (or including) the first and second side plates 52, 54 and coupled to a plurality of spring devices, including a first spring device 96 and a second spring device 98 (see, FIGS. 2 and 4). The side plates 52, 54 can be composed of any suitable material, such as steel, and formed by any convenient and conventional method. The side plates 52, 54 have upper portions 52a, 54a and lower portions 52b, 54b, respectively, and are removably coupled to the support structure 12 of the vehicle 10 by bolts, however, other coupling devices can be utilized as determined by the user. The positioning of the side plates 52, 54 along the vehicle support structure 12 is determined by the intended use and operation of the vehicle 10. The first spring device 96 and the second spring device 98 each include a first portion or end 100 and a second portion or end 102. The first ends 100 of the first spring device 96 and the second spring device 98 are shown coupled to the housing 56 at the upper portions 52a, 54a of the side plates 52, 54, respectively. A portion of the upper portion 54a of the second side plate 54 is shown partially removed to more clearly indicate that the first end 100 of second spring device 98 coupled thereto.

Figure 6:
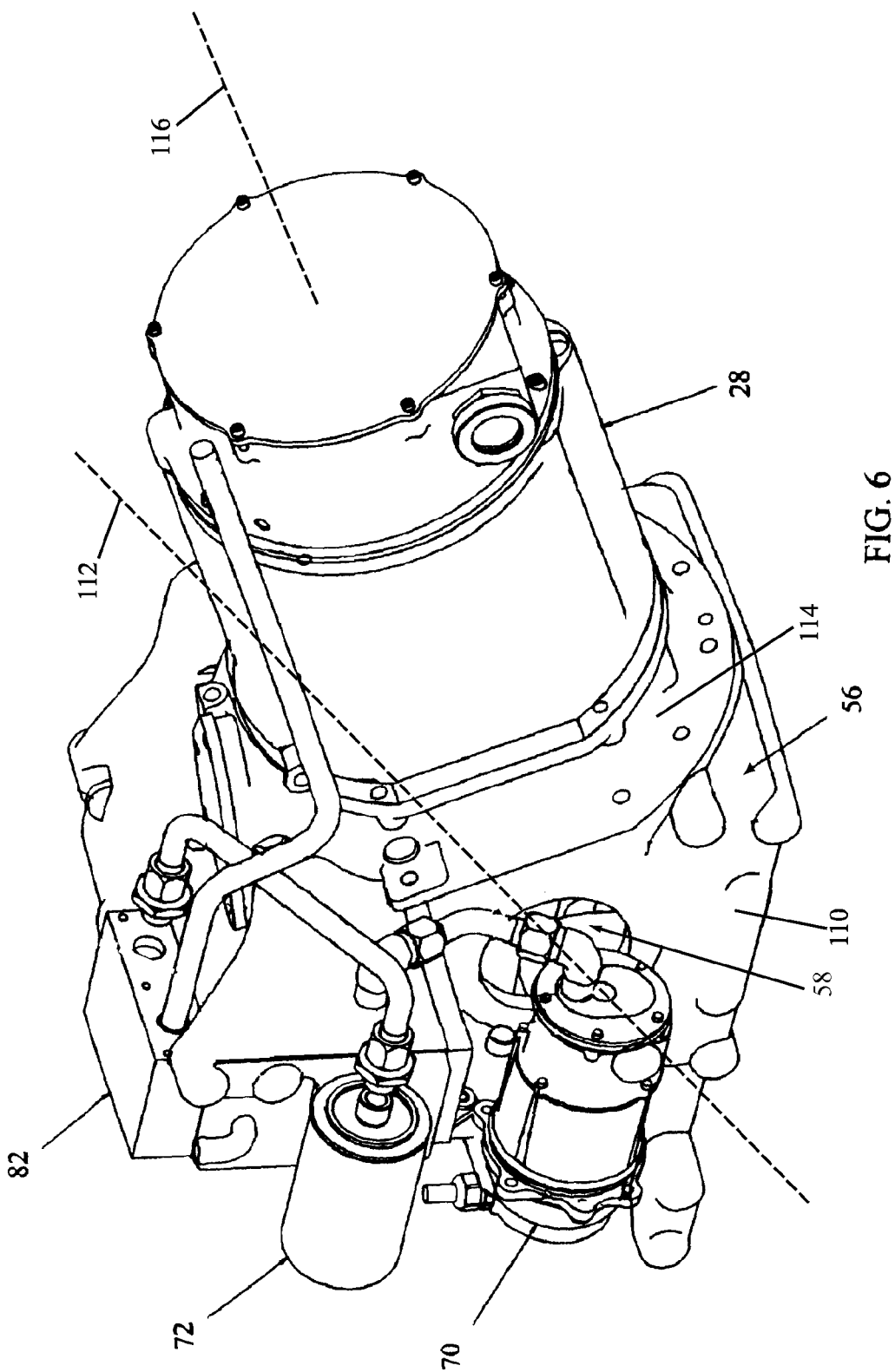
FIG. 6 is a perspective view of an exemplary embodiment of a housing and electric motor of a self-contained axle module and illustrating an oil pump mounted in the sump of the housing, an oil filter mounted on the housing, a heat exchanger mounted on the housing and the conduit connections between such devices for cooling and heating oil in the axle module.

The housing 56 can be composed of any suitable material, such as iron, steel, or aluminum and can be cast and machined as designed by the manufacturer. The housing 56 includes a sump portion 110 in the lowest area of the housing 56. As shown in FIGS. 4 and 6, sump portion 110 defines a lateral axis 112. The housing 56, in addition to the components described below, also houses a gear train 58 (as shown partially in FIG. 6). The gear train 58 is rotatably coupled to and transmits force from the electric motor 28 to an output shaft 60, which is shown projecting externally from opposite sides of the housing 56. The gear train 58 may include several types of gears such as planetary gears, sprocket gears, bevel gears or the like with selected gear ratios as determined by the manufacturer and operator of the vehicle 10.

An electric motor 28 is coupled to (e.g., supported by) an interface portion 114 of the housing 56 and to the source for electric power. As shown in FIGS. 5-6, interface portion 114 defines a longitudinal axis 116. As described above, the source for electric power can be the engine/generator 18, 20, with the power routed through the power bus 42. It should also be understood that the source of power can be the energy storage device 26 as routed through the power converter 24 and the power bus 42. Control of the power routing is provided through the vehicle controller 34 over the data bus network 76.

A motor drive control unit 30 is coupled to the electric motor 28 and to the vehicle controller 34 to communicate signals to the vehicle controller 34 such that one of the speed and torque of the electric motor 28 is controlled based upon the signals. The motor drive controller 30, working in conjunction with the vehicle controller 34, can operate at preset parameters or in response to inputs from an operator typically situated in the cab of the vehicle 10. However, it should be understood that control of the vehicle can be established and maintained outside of the vehicle 10 with a tethered control unit remotely by use of radio frequency signals, infrared signals, or the like.

Figure 2:
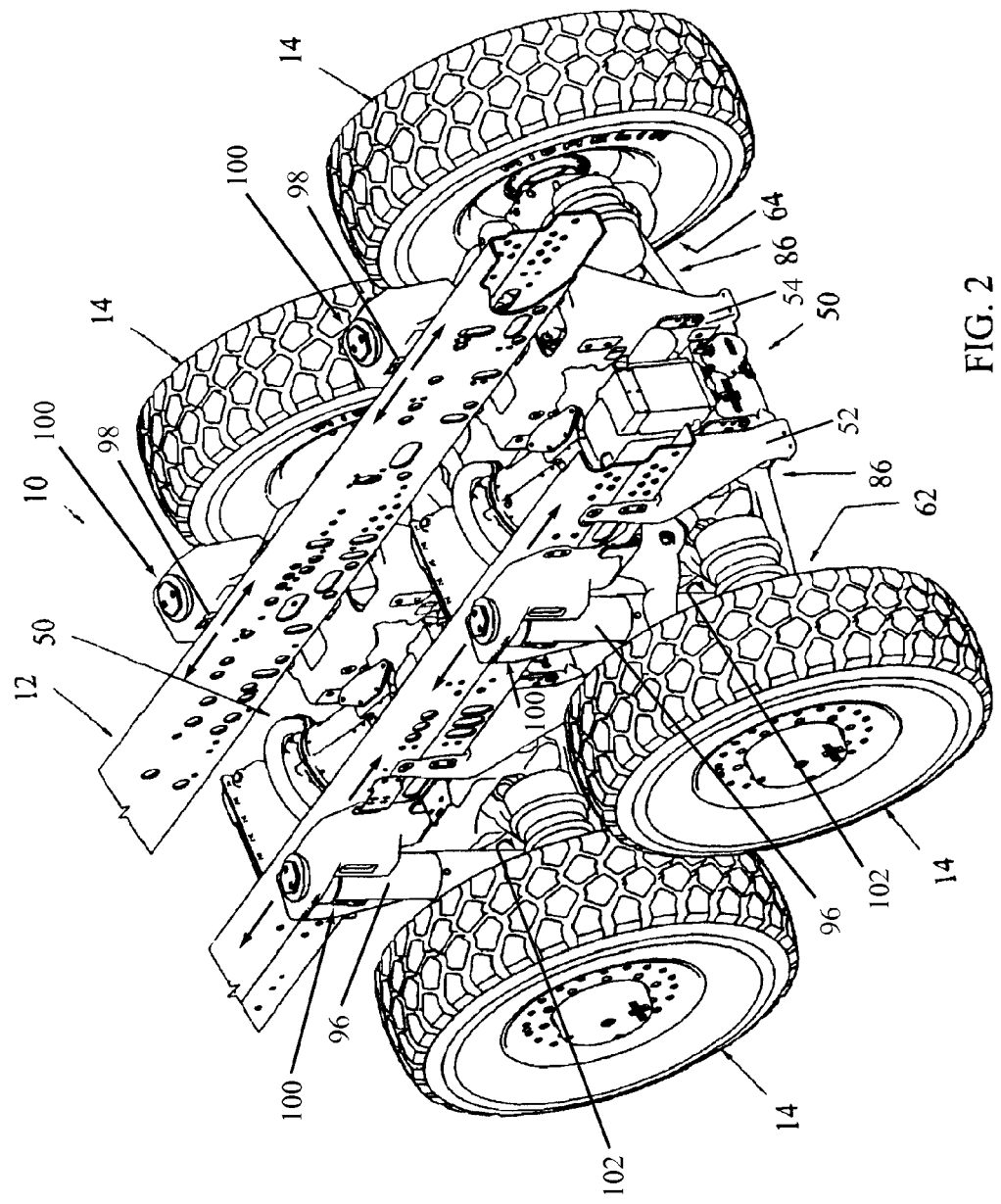
FIG. 2 is a partial perspective view of an exemplary embodiment of a vehicle including a self-contained axle module coupled to a vehicle support structure of the vehicle.

The self-contained axle module 50 can be selectively coupled and decoupled from the support structure 12 as determined by the operator of the vehicle 10. It should also be understood that the self-contained axle module 50 can be mounted as illustrated in FIG. 2 wherein two separate self-contained axle modules 50 may be mounted to the vehicle support structure 12 in a tandem arrangement at any one of a plurality of positions relative to the other such as those indicated by the arrows. However, one or both of the illustrated self-contained axle modules 50 can be rotated 180 degree relative to the vehicle support structure 12 as such configuration is convenient or appropriate for the intended use of the vehicle 10. It should also be understood that one more or one less self-contained axle module 50 can be coupled or decoupled from the vehicle support structure 12 as determined by the user or manufacturer of the vehicle 10, such as by removing the housing from the support structure 12 (e.g., by uncoupling the side plates 52, 54).

A self-contained axle module 50 may also include a first wheel end assembly 62 coupled to the housing 56 and the output shaft 60 and a second wheel end assembly 64 coupled to the housing 56 and the output shaft 60. The output shaft 60 is shown including a first segment 60*a* and a second segment 60*b*. The first wheel end assembly 62 is shown coupled to the first segment 60*a* and the second wheel end assembly 64 is shown coupled to the second segment 60*b*. The wheel end assemblies 62, 64 can include a wheel, a tire, a wheel brake, and a multiple input drive unit brake. Wheel end assemblies receive as inputs rotational mechanical energy from (e.g., are rotatably coupled to) the output shaft 60. The wheel end assemblies may also be coupled to a track, for example, on a bulldozer.

A self-contained axle module 50 can also include an oil pump 70 mounted inside the housing 56. The oil pump 70 and its associated motor is configured to be immersed in oil contained in the sump portion 110 of the housing 56. (See FIG. 6.) An oil filter 72 is also mounted on the housing and fluidly coupled to the oil pump 70. The heat exchanger 82 can also be mounted on the housing 56 and configured to provide cooling for the interior of the housing 56, or to other components within the housing, such as with the heat exchanger 82 fluidly coupled to the oil filter 72 and oil pump 70. The heat exchanger 82 may also be coupled to the source of cooling medium which may be the oil in the sump portion 110 of the housing 56 or a supplemental cooling source mounted on the support structure 12 of the vehicle 10 with the oil pump submersed in the oil in the housing 56. The oil pump 70 may also be used to preheat the oil and axle components. Preheating of the oil and the axle components reduces the stress on the components particularly in cool or cold environments. By mounting the oil cooling and pumping components directly onto the housing 56 of the self-contained axle module 50, high pressure oil lines routed through the truck are not necessary, thereby providing cost reductions and operational efficiency to the system.

The self-contained axle module 50 may also include a skid plate 80 coupled to the first and second side plates 52, 54 and configured to protect the underside portion of the housing 56 (See FIGS. 3-5).

The self-contained axle module 50 may also include a power take-off (PTO) apparatus 74 mounted on the housing 56 and coupled to the gear train 58 and a tool. (see, FIGS. 3 and 4). The PTO can be used to drive the tool, such as a pump to power other equipment associated with the vehicle 10. The PTO can be configured to operate at a speed independent of wheel 14 speed of the vehicle 10 and dependent on the electric motor 28 speed, or the PTO can be configured to operate at a speed related to both electric motor 28 speed and wheel 14 speed. The electric motor 28 provides power to the PTO through the gear train 58 and can be coupled or uncoupled to the output shaft 60 of the self-contained axle module 50.

It is also contemplated that the vehicle 10 may also include a plurality of independent suspension assemblies 86 which independently suspend one of the wheel end assemblies relative to the vehicle support structure. Referring to FIG. 4, a first independent suspension assembly 86*a* and a second independent suspension assembly 86*b* are shown each having a first portion or end 88, a second portion or end 90, an upper arm 92, and a lower arm 94 according to an exemplary embodiment. First portions 88 of first independent suspension assembly 86*a* and second independent suspension assembly 86*b* are shown coupled to housing 56 at the lower portions 52*b*, 54*b* of side plates 52, 54, respectively. Second portions 90 of first independent suspension assembly 86*a* and second independent suspension assembly 86*b* are shown coupled to their respective wheel end assemblies 62, 64 to permit movement of each wheel end assembly independent of the housing and the other wheel end assembly. Also, second ends 102 of first spring device 96 and second spring device 98 are shown coupled to lower arms 94 of first portions 88 of first independent suspension assembly 86*a* and second independent suspension assembly 86*b*, respectively. The lower arm 94 of second independent suspension assembly 86*b* is shown partially removed in FIG. 4 to more clearly indicate second spring device 98 coupled thereto.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

The foregoing description of embodiments has been presented for purposes of illustration and description. It is not intended to be exhaustive or to be limited to the precise forms disclosed, and modifications and variations are possible in light of the above teachings. The embodiments were chosen and described in order to explain the principles of the self-contained axle module and its practical application to enable one skilled in the art to utilize the various embodiments and with various modifications as are suited to the particular use contemplated. It is intended that the scope of the self-contained axle module be defined by the claims appended hereto and their equivalents.

What is claimed is:

1. A self-contained axle module with independent suspension for a vehicle, comprising:

a housing having a sump portion and an interface portion, wherein the housing is configured to be coupled to a support structure of the vehicle;

an electric motor supported by the interface portion of the housing and disposed along a first axis, wherein the electric motor is rotatably coupled to a gear train positioned within the sump portion of the housing, the gear train having an input along the first axis and a first output and a second output disposed coaxially along a second axis;

a heat exchanger mounted on the housing and configured to provide cooling for a component within the housing from a supplemental cooling source;

a first wheel end assembly coupled to the first output of the gear train;

a second wheel end assembly coupled to the second output of the gear train;

a first independent suspension assembly having a first end coupled to the housing and a second end coupled to the first wheel end assembly;

a first spring having a first end coupled to the housing and a second end coupled to the first independent suspension assembly;

a second independent suspension assembly having a first end coupled to the housing and a second end coupled to the second wheel end assembly; and a second spring having a first end coupled to the housing and a second end coupled to the second independent suspension assembly;

wherein the independent suspension assemblies and the wheel end assemblies and the housing and the electric motor and the gear train and the springs are configured to be removable from the support structure as a unit by removing the housing from the support structure.

2. The self-contained axle module of claim 1, wherein the housing is coupled to a first side plate and a second side plate, and the first side plate and the second side plate are configured to be removably coupled to the support structure.

3. The self-contained axle module of claim 2, further comprising a skid plate coupled to the first and second side plates and configured to protect an underside portion of the housing.

4. The self-contained axle module of claim 1, further comprising a first side plate and a second side plate coupled to the housing, the first side plate and the second side plate having an upper portion and a lower portion, the independent suspension assemblies being coupled to the lower portions and the first ends of the springs being coupled to the upper portions.

5. The self-contained axle module of claim 4, wherein the independent suspension assemblies include at least one of an upper arm and a lower arm, the second ends of the springs being coupled to one of the upper arm and the lower arm.

6. A self-contained axle module system for a vehicle, comprising:
a first self-contained axle module and a second self-contained axle module configured to be coupled to a support structure of the vehicle at any one of a plurality of positions relative to the other, each self-contained axle module comprising:
a housing having a sump portion and an interface portion;
an electric motor coupled to the interface portion and supported along a length of the housing, wherein the electric motor is rotatably coupled to a gear train positioned within the sump portion of the housing;
a power take-off coupled to the gear train and mounted on the housing;
a first wheel end assembly coupled to the gear train with a first half-shaft extending laterally from the housing with respect to the electric motor;
a second wheel end assembly coupled to the gear train with a second half-shaft extending laterally from the housing with respect to the electric motor;
a first independent suspension assembly having a first end coupled to the housing and a second end coupled to the first wheel end assembly;
a first spring having a first end coupled to the housing and a second end coupled to the first independent suspension assembly;
a second independent suspension assembly having a first end coupled to the housing and a second end coupled to the second wheel end assembly; and
a second spring having a first end coupled to the housing and a second end coupled to the second independent suspension assembly;
wherein the independent suspension assemblies and the wheel end assemblies and the housing and the electric motor and the gear train and the springs are configured to be removable from the support structure as a unit by removing the housing from the support structure.

7. The self-contained axle module system of claim 6, wherein each housing comprises a first side plate and a second side plate, and the first side plate and the second side plate are configured to be removably coupled to the support structure.

8. The self-contained axle module system of claim 7, wherein each side plate includes an upper portion and a lower portion, the independent suspension assemblies being coupled to the lower portions and the first ends of the springs being coupled to the upper portions.

9. The self-contained axle module system of claim 8, wherein the independent suspension assemblies include at least one of an upper arm and a lower arm, and the second ends of the springs are coupled to one of the upper arm and the lower arm.

10. The self-contained axle module system of claim 7, further comprising a skid plate coupled to the first and second side plates of each housing, the skid plate being configured to protect an underside portion of the housing.

11. The self-contained axle module system of claim 6, further comprising a heat exchanger mounted on each housing.

12. A self-contained axle module with independent suspension for a vehicle, the self-contained axle module comprising:
a housing having a sump portion defining a lateral axis and an interface portion defining a longitudinal axis, wherein the housing is configured to be coupled to a support structure of the vehicle;
an output shaft extending along the lateral axis of the housing and projecting externally from the sump portion;
an electric motor coupled to the interface portion along the longitudinal axis of the housing and operable to rotate the output shaft about the lateral axis of the housing, wherein the electric motor is configured to be coupled to a drive controller, wherein the electric motor selectively receives electrical energy that drives the electric motor or mechanical energy during regenerative braking;
a first wheel end assembly coupled to the output shaft; and
a first independent suspension assembly coupled to the first wheel end assembly and to the housing to permit movement of the first wheel end assembly independent of the housing;
wherein the first independent suspension assembly, the first wheel end assembly, and the housing are removable from the support structure as a unit by removing the housing from the support structure.

13. The self-contained axle module of claim 12, further comprising a second wheel end assembly coupled to the output shaft and a second independent suspension assembly coupled to the second wheel end assembly and to the housing to permit movement of the second wheel end assembly independent of the housing and the first wheel end assembly.

14. The self-contained axle module of claim 13, wherein the output shaft includes a first segment and a second segment, the first segment being coupled to the first wheel end assembly and the second segment being coupled to the second wheel end assembly.

15. The self-contained axle module of claim 14, wherein the housing further comprises a first side plate removably coupled to the support structure of the vehicle and a second side plate removably coupled to the support structure of the vehicle.

16. The self-contained axle module of claim 15, wherein the first independent suspension assembly is coupled to the first side plate, the second independent suspension assembly is coupled to the second side plate.

17. The self-contained axle module of claim 16, wherein the housing is removable from the support structure by removing the first and second side plates from the support structure.

18. The self-contained axle module of claim 14, further comprising a gear train disposed within the housing and rotatably coupled to the electric motor and the output shaft.

19. The self-contained axle module of claim 13, further comprising a first spring and a second spring, wherein the first spring includes a first end coupled to the housing and a second end coupled to the first independent suspension assembly and the second spring includes a first end coupled to the housing and a second end coupled to the second independent suspension assembly.

* * * * *